United States Patent
Pearson

Patent Number: 5,903,754
Date of Patent: May 11, 1999

[54] DYNAMIC LAYERED PROTOCOL STACK

[75] Inventor: Malcom E. Pearson, Bellevue, Wash.

[73] Assignee: Microsoft Corporation, Redmond, Wash.

[21] Appl. No.: 08/970,958

[22] Filed: Nov. 14, 1997

Related U.S. Application Data

[63] Continuation of application No. 08/263,063, Jun. 21, 1994, abandoned.

[51] Int. Cl.$^6$ .................................................. G06F 9/40
[52] U.S. Cl. ........................................ 395/680; 395/200.6
[58] Field of Search .................................. 395/680, 200.6

[56] References Cited

U.S. PATENT DOCUMENTS

| | | | |
|---|---|---|---|
| 4,991,133 | 2/1991 | Davis et al. | 395/375 |
| 5,278,834 | 1/1994 | Mazzola | 370/94.1 |
| 5,339,430 | 8/1994 | Lundin et al. | 395/700 |
| 5,446,736 | 8/1995 | Gleeson et al. | 370/473 |
| 5,448,566 | 9/1995 | Richter et al. | 370/94.1 |
| 5,491,800 | 2/1996 | Goldsmith et al. | 395/200.12 |
| 5,499,343 | 3/1996 | Pettus | 395/200.2 |
| 5,509,123 | 4/1996 | Dobbins et al. | 395/200.15 |
| 5,515,508 | 5/1996 | Pettus et al. | 395/200.01 |

OTHER PUBLICATIONS

Koivisto, Juha, and James Reilly, "Generating Object–Oriented Telecommunications Software Using ASN.1 Descriptions," *Upper Layer Protocols, Architectures and Applications*, G. Neufeld and B. Plattner (Editors), Elsevier Science Publishers, (North–Holland), 1992, pp. 133–147.

Feldhoffer, Magdalena, "Object–Oriented Modeling of the Application Layer Structure," *Upper Layer Protocols, Architectures and Applications*, G. Neufeld and B. Plattner (Editors), Elsevier Science Publishers, (North–Holland), 1992, pp. 235–247.

*Primary Examiner*—Alvin Oberley
*Assistant Examiner*—St. John Courtenay, III
*Attorney, Agent, or Firm*—Workman Nydegger & Seeley

[57] ABSTRACT

The present invention provides a method and system for dynamically building a protocol stack for use by a communication program to establish a data transfer protocol. The method of creating the protocol stack first establishes a set of protocol layer descriptions. One protocol layer description is used to establish an initial protocol layer that has a protocol interface. For each other protocol layer description, a current protocol layer having an interface is established using the protocol layer description, and the current protocol layer is connected to a previously established protocol layer using one of the interfaces from the previously established protocol layer. In this manner, the protocol layers are connected in pairs. These connected protocol layers make up a protocol stack. Finally, the method provides the interface from a protocol layer, e.g., the top layer, to the communication program. When the communication program prepares data for transmission, the methods of the protocol stack are invoked against the data by invoking the interface provided to the communication program. In this manner, the data is processed by each layer of the protocol stack in turn as the protocol layers pass the data via the interfaces. The protocol stack is readily modifiable by modifying the protocol layer descriptions and rebuilding the protocol stack.

25 Claims, 6 Drawing Sheets

DYNAMIC LAYERED PROTOCOL STACK

This application is a continuation of U.S. application Ser. No. 08/263,063, filed Jun. 21, 1994 now abandoned, for DYNAMIC LAYERED PROTOCOL STACK.

TECHNICAL FIELD

The present invention relates to a protocol component in a communication program and, more particularly, to a protocol stack made up of a set of protocol layers that can be dynamically created and reconfigured.

BACKGROUND OF THE INVENTION

Computer programs often carry out a specific function such as word processing, database management and inter-system communications. Communication programs provide inter-program or inter-system communication capability among other functions. An example of such a communication program is Microsoft Mail, developed by Microsoft Corporation, Redmond, Wash. Microsoft Mail provides for the transfer of electronic information between connected computer systems. Programs such as Microsoft Mail include protocol components that control how the program communicates with other programs.

A set of requirements that define communication between programs is commonly referred to as a communication protocol. Protocols include X25 for modems and integrated services digital network (ISDN), which are standards developed by the computer industry. These protocols will dictate how data is formatted when it is to be transmitted over computer connections. For example, a protocol will dictate the amount of data in a packet (i.e., the size of a data chunk that is transmitted), the header information for a packet, and any other reliability or encoding that is to be done to the data that is being transmitted. Thus, when a program is described as conforming to X25, the user knows that the program can communicate with other "X25" programs since they all conform to the same protocol, e.g., they all handle data in the same manner. In addition to such industry protocols, there are other communication elements that improve or change the data transmission protocol such as encryption and compression. These two functions provide improved security and increased bandwidth, respectively. In practice, any set of requirements that is agreed on between two programs is the communication protocol for those programs. As an example, a protocol might be X25 with a particular type of run length encoding. The computer systems sending and receiving data pursuant to this protocol must be able to understand the X25 packaging and to compress and decompress the data according to the particular run length encoding scheme.

Although it might be referred to as a distinct part of a communication program, the protocol component is usually a combination of functions integrated into the communication program. Thus, once created, the protocol component is static within a communication program and cannot be changed without replacing or modifying the entire program. In order to change the protocol component of a communication program, the entire program would have to be recompiled or relinked. Thus, it is usually the case that a communication program's protocol is set when the program is created, e.g., coded by the company producing the program. To change the protocol, whether because of errors in the original protocol or because of modifications to the protocol, the entire program must be replaced. For users of multiple communication programs who need to interconnect computer systems operating these programs, this limitation on modifying protocols can be an absolute roadblock to system interconnection. Further, such integration of the protocol component makes it difficult if not impossible for third parties to provide enhancements to another company's communication program with respect to the protocol. This makes it difficult for third parties to add value to existing communication programs.

The general problem of separately developing and modifying program components is dealt with by some programmers by adopting object oriented programming techniques. The use of object oriented programming techniques can facilitate the development of complex computer programs by allowing key functions to be created as separate entities, which are testable and replaceable separate from the other program parts. One such programming language is C++. Object oriented programming basics are introduced herein for ease in understanding certain characteristics of the present invention.

Object oriented programming is based on class definition and usage. A class is a user-defined type that includes both data and the methods (procedures and functions) to operate on the data. The class definitions are used to create objects which are used in actual programs. To create and use an object, a class is declared, then an object of a class is declared (the object is instantiated) and then the object is used. The data is said to be encapsulated within the object to protect it from outside access except by means of the predefined method calls. When in use, an object is a component of a running program; the object has an internal state defined by the state of the object's variables and a published interface that allows other components to interact with the object. (The term "published" refers to the fact that the interface information is known to and can be used by other programs or clients.) The interface to an object is generally defined by the set of methods defined by the object's class. The interface is a set of methods which abide by certain input, output, and behavior rules. If an object supports a particular interface, the client program using the object can invoke the methods of that interface to effect the defined behavior. A client is bound to an object through a pointer to an interface.

Calling an object's methods is similar to sending the object a message—it causes the object to do something. In this sense, an object can be likened to a functions in a programming language such as Pascal. When a function is called from a client program it carries out the procedures it is programmed to perform; the particular procedure might depend on how the function is actually called.

There are several types of classes: concrete, abstract, and pure virtual classes. If an instance of the class can be made then it is a concrete class. In contrast, if an abstract class is being dealt with, an instance of the class cannot be made. Rather, an abstract class is useful because it defines an object's interface but does not define all of its behavior. It is the responsibility of the program implementing the class to provide the actual code for the methods available to manipulate the class instance data. Abstract classes are also called pure virtual classes in C++ programming terminology. An abstract class has one or more method undefined. In contrast, a pure virtual class has no methods defined. Therefore, to use an abstract class, some of the methods must be provided, where a pure virtual class requires that all methods are provided.

Class declarations and object instantiation are illustrated by the following example. A class named CIRCLE is declared as follows:

```
class CIRCLE
{public
  int x, y;
  int radius
  void draw( );};
```
In the declaration, variables x and y specify the center location of a circle and variable radius specifies the radius of the circle. These variables are the data members of the class CIRCLE. The function draw is a user-defined function that draws the circle having the radius and location identified by the variables. The function draw is a method of the class CIRCLE. The data and methods of a class are bound together in that the method operates on an instance of the class, i.e., on the actual data. As noted above, an instance of the class is known as an object.

In C++ syntax, the following statement declares the objects a and b to be of type class CIRCLE.

CIRCLE a, b;

This declaration causes the allocation of memory for the objects a and b, thereby creating two instances of the class CIRCLE. The following statements assign data to the data members of objects a and b.

a.x=2;
a.y=2;
a.radius=1;
b.x=4;
b.y=5;
b.radius=2;

Given those data assignments, the following statements are used to draw the circles defined by objects a and b.

a.draw( );
b.draw( );

This is a simple example of creating a class, creating an object or instance of the class, then assigning values to the data within the object and calling the methods of the object to carry out the object's function. These are standard object oriented processes illustrated with C++ type commands.

Another programming concept that is becoming quite common is the use of link libraries. A link library is an executable module containing services that programs can call to perform useful tasks. For example, a user identification library might be provided; a number of program could then incorporate the library into their programs with a simple set of calls, thereby avoiding the reinvention of the user identification process. The benefits of using libraries include: not having to recode the same or a similar function in a number of programs; less storage space is taken up because, at least initially, only one copy of the library code is required; and a number of program can have consistent functionality. These libraries play an important role in operating systems which use them to make their services and resources available to the programs that are executed in conjunction with the operating system.

Link libraries are often static-link libraries. These are used in C-language programs. When linking such a program before use, the compiler incorporates information from the appropriate static-link library directly into the program's executable file. The primary advantage of static-link libraries is that they make a standard set of services available to programs, and do not require the programs to include the original source code for those services. However, because static-link libraries are incorporated into the executable code of programs, the static-link libraries and programs lose their physical distinctiveness when linked. As a result, neither the programs nor the static-link libraries can be updated without having to re-link the static-link libraries with the programs. Re-linking is much like recompiling in that the process is necessary to create an executable program. Thus, the re-linking must be performed before the program can be used.

Dynamic-link libraries are similar to run-time libraries, such as C-language run-time libraries. However, dynamic-link libraries are linked with programs at run time, not when the programs' files are linked with a compiler. Since a dynamic-link library is linked at run time, not at compile time, a copy of the library is not inserted into the programs' executable files. Instead, a copy of the library is loaded into memory while the programs are actually running. As a result, the programs and dynamic libraries are always physically distinct. Such distinctness allows the programs and dynamic-link libraries to be updated, compiled, and tested separately from each other.

By using dynamic-link libraries, several programs can share a single copy of a service. If two programs are running at the same time and both use a particular service both can share a single copy of the source code for that service. In addition to being able to share a single copy of code, programs using dynamic-link libraries can share other resources, such as data and hardware.

Some object oriented languages also support the concept of a dynamic class. A dynamic class is similar to a conventional C++ class but allows a class object to be instantiated at run time, rather than during initial coding, thereby making it possible to build object oriented, run-time replaceable, run-time extendible code. A dynamic class can be fully defined in a dynamic-link library (DLL).

The present invention recognizes that these programming techniques provide tools that are particularly useful for creating dynamic protocol stacks. Particularly, the invention recognizes that protocol layers can be defined such that each layer performs a specific protocol function and that the interfaces between these protocol layers are necessarily consistent. By implementing a consistent object model, the protocol layers are interchangeable and independently modifiable, and the protocol stack is dynamically modifiable. This solves the current problem of fixed protocol functionality.

SUMMARY OF THE INVENTION

The present invention provides a method and system for dynamically building a protocol stack for use by a communication program to establish a data transfer protocol. The protocol stack replaces fixed code segments within the communication program. One object of the present invention is to provide a method of building the protocol stack at run-time so that any current modifications to the protocol stack will be included when the communication program is executed.

The method of creating the protocol stack first reads a protocol layer description from a stack description file, which includes a set of protocol layer descriptions. The protocol layer description is used to establish an initial protocol layer that has a protocol interface. For each other protocol layer description, the description is read from the stack description file, a current protocol layer having an interface is established using the protocol layer description, and the current protocol layer is connected to a previously established protocol layer using one of the interfaces from the previously established protocol layer. This creates a link between the protocol layers. These connected protocol layers make up a protocol stack. Finally, the method provides the interface from the top protocol layer to the communication program. When the communication program prepares data for transmission, the methods of the protocol stack are invoked against the data by invoking the interface provided to the communication program. The data is processed by each layer of the protocol stack in turn as the protocol layers pass the data via the interfaces.

In accordance with further aspects of the invention, the step of reading the stack description file includes reading the protocol layer descriptions in a predetermined order. In alternate embodiments, the protocol layer descriptions are read in a bottom-to-top order and in a top-to-bottom order. In each case, the step of connecting the current protocol layer to a previously established protocol layer uses an interface from the previously established protocol layer.

It is a further object of the present invention to provide an object oriented programming solution to creating protocol stacks. Thus, in one embodiment, the step of establishing each protocol layer includes the steps of creating an instance of a class and creating a protocol layer object interface from the instance of a class, wherein the protocol layer object represents a protocol layer. In this manner, the protocol layer objects are connected to form a protocol stack. Because the preferred implementation represents each layer with a model object, each layer can be designed, implemented and tested in isolation relative to the entire stack. In addition, existing code can be easily modified to conform to the present invention's object model.

In accordance with other aspects of the present invention, type checking and interface requirements are used to ensure that changing of layers does not affect operation of other layers. Thus, the type of the protocol layer object is checked when it is established. Further, the interface is checked during the connection step to ensure that it is of the type required by the protocol layer object to which it is connecting. This particular implementation using object oriented programming minimizes the dependencies between layers and localizes functionality inside layers. Strict layering results in truly interchangeable protocol layers.

In accordance with still further aspects of the present invention, the steps of the method are carried out by a stack builder routine. This routine can be executed during the execution of a communication program, which will use the protocol stack. In this manner, the stack description file can be modified prior to execution of the communication program, and a modified protocol stack will be created by the stack builder. This dynamic method allows independent vendors and users to modify, including deleting and adding, layers to the communication program.

A further object of the present invention is to provide a method for building a protocol stack for use by a communication program to establish a data transfer protocol. The protocol stack is made up of protocol layers connected in a pair-wise fashion. The method includes the step of processing a set of protocol functions by establishing a protocol object for each function. This is done by creating an object representing the protocol function. As the protocol objects are created, the method connects pairs of protocol objects using an interface from one of the protocol object pair. All protocol objects are thus connected and the connected protocol objects make up a protocol stack. The interface from a protocol object that is connected to only one other protocol object is presented to the communication program, whereby the communication program uses the interface to invoke the methods of the protocol stack.

Another object of the present invention is to provide a system for dynamically creating a protocol stack. The protocol stack building system is included in a computer system having a memory component and a processor. The system includes a stack description file stored in the memory, the stack description file includes a set of protocol layer description. The system also includes a stack builder executed by the processor for creating a protocol stack. The stack builder including means for establishing a protocol layer using a protocol layer description from the stack description file, each protocol layer having an interface, and for each currently established protocol layer (except the first layer that is established), connecting the current protocol layer to a previously established protocol layer using an interface from that previously established protocol layers. The resultant group of connected protocol layers makes up a protocol stack that can be accessed by a communication program using the interface from a protocol layer.

In accordance with further aspects of the present invention, the method and system can be used to create any type of functional stack wherein data is operated on by the layers of the stack in an ordered manner. The invention requires that a functional description file be established, and then a functional stack builder can create and connect functional layers in accordance with the present invention.

DETAILED DESCRIPTION OF THE INVENTION

The present invention includes a system for dynamically creating layered protocol stacks and for using them in computer programs that require communication functionality (hereinafter "communication programs"). The layered protocol stacks of the present invention can be incorporated into any system that requires communication between two or more communication programs. To be successful, the communication must be done in accordance with a protocol that is shared by, or at least comprehensible to, the communicating programs. The present invention provides means for establishing the necessary protocol within a communication program, even as the protocol requirements are changing.

An example of a simple communication system in which the present invention can be used supports communication between two communication programs over a modem connection. In the present example, it is assumed the two communication programs are identical. For example, the programs could be Microsoft Mail, an electronic mail program provided by Microsoft Corporation of Redmond, Wash. In general, the communication programs provide a set of users with means for creating, transmitting and receiving information. One goal of these communication programs is to allow users to communicate among a variety of interconnected computers e.g., networked systems, and among a variety of communications programs. The differences between computers and programs should not be apparent to the user.

Figure 1:
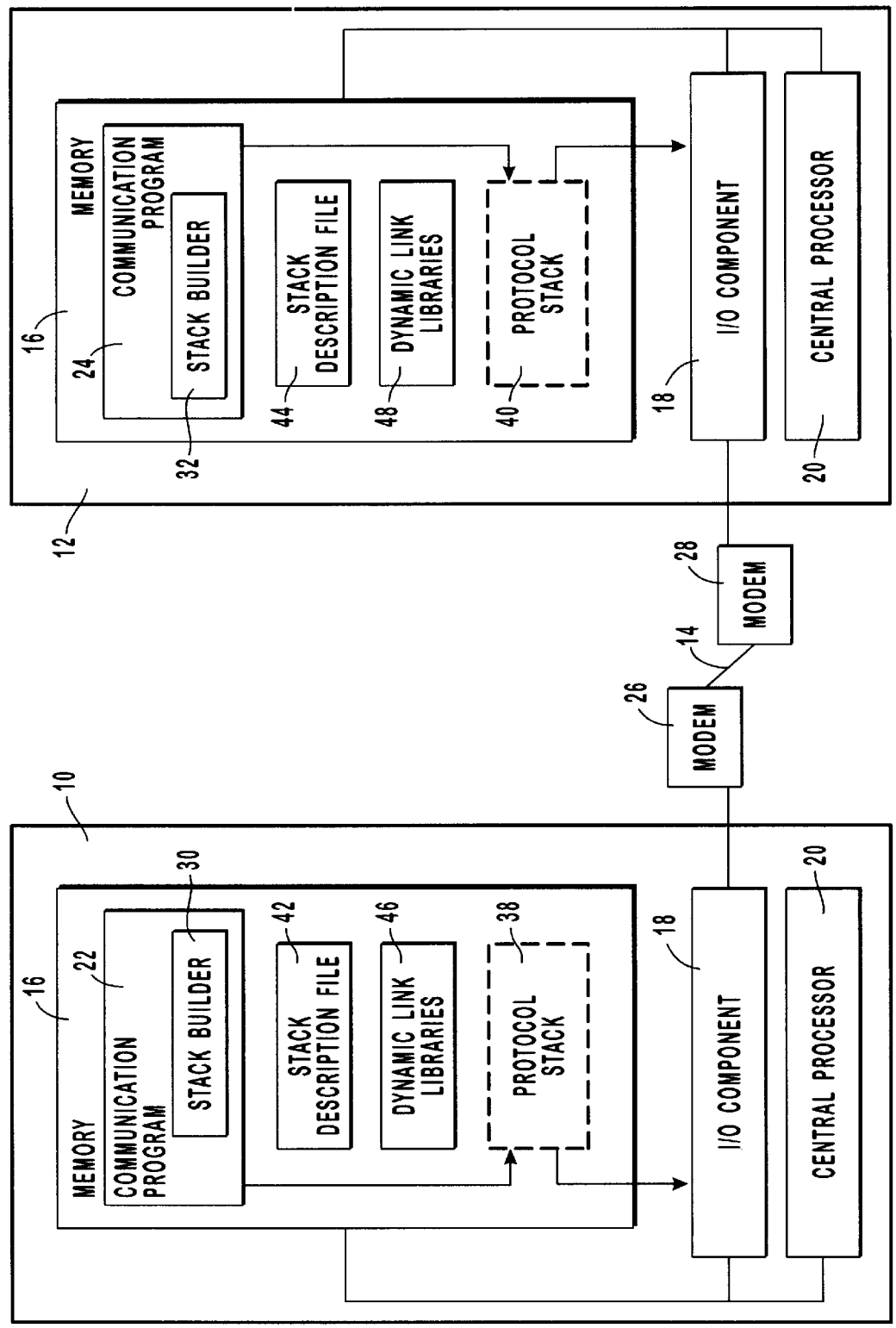
FIG. 1 is a block diagram of a computerized computer communication system in which the present invention can be incorporated.

With reference to FIG. 1, two computers 10 and 12 are connected over network 14. Each computer includes a memory 16, an input/output component 18 and a central processor 20. The memory component may be a local hard disk or floppy disk or some type of remote memory element. Each computer has stored in memory a communication program 22 or 24. The actual communication between the computers is established between the input/output components 18 and a pair of modems 26 and 28 over the network 14. The modems will include their own control components that are not described herein. A user can communicate with one of the computers via a keyboard, mouse or other input component connected to one of the input/output components but not shown.

Each communication program includes a stack builder 30 or 32. When a communication program is executed by its central processor, the corresponding builder is also executed. If the stack builder executes successfully, it creates a protocol stack 38 or 40, shown in reference. The protocol stacks make up the protocol functions that facilitate the communications between the communication program and a modem and are based in part on the communication requirements between the modems. The stack builder reads layer descriptions from a stack description file 42 or 44 and creates a protocol stack from dynamic link library 46 or 48 that includes a layer for each layer description.

The protocol layers might include functionality that controls compression, encryption, reliability, routing control, format conversion, etc. The features that are provided in the protocol stack are those that are important at a systems communication level, e.g., compression of the data within a message reduces the bandwidth required to transmit the data, and are not necessarily user level features. Nonetheless, certain of the same features might be desired by a particular user, e.g., encryption of sensitive messages, and these can be performed separately from the protocol stack within the user's communication program.

Assuming that execution of the stack builder is successful, each communication program 22 and 24 has access to a protocol stack 38 and 40, respectively. The protocol stacks replace fixed protocol program instructions within the communication programs. When communication actually takes place between computers 10 and 12, the protocol stacks are executed to ensure the desired protocols are supported.

By defining a protocol as a combination of functions, each function being separately identified and encoded, an appropriate protocol stack can be created for each communication program. In a preferred embodiment, a hierarchical approach to the protocol layers is implemented—a higher protocol layer is one that makes use of a lower protocol layer to implement its function. In addition, each layer is implemented as an object in an object oriented programming environment. By using object oriented programming principles, the relationship between layers is controlled to ensure a proper protocol stack is created. Although the classes for the protocol layers must be defined before the protocol stack can be created, for ease of understanding the protocol stack, and its relationship to the stack description file and the dynamic link library will be first described. The actual definition of protocol classes and the process for creating the protocol stack are then described.

Figure 2:
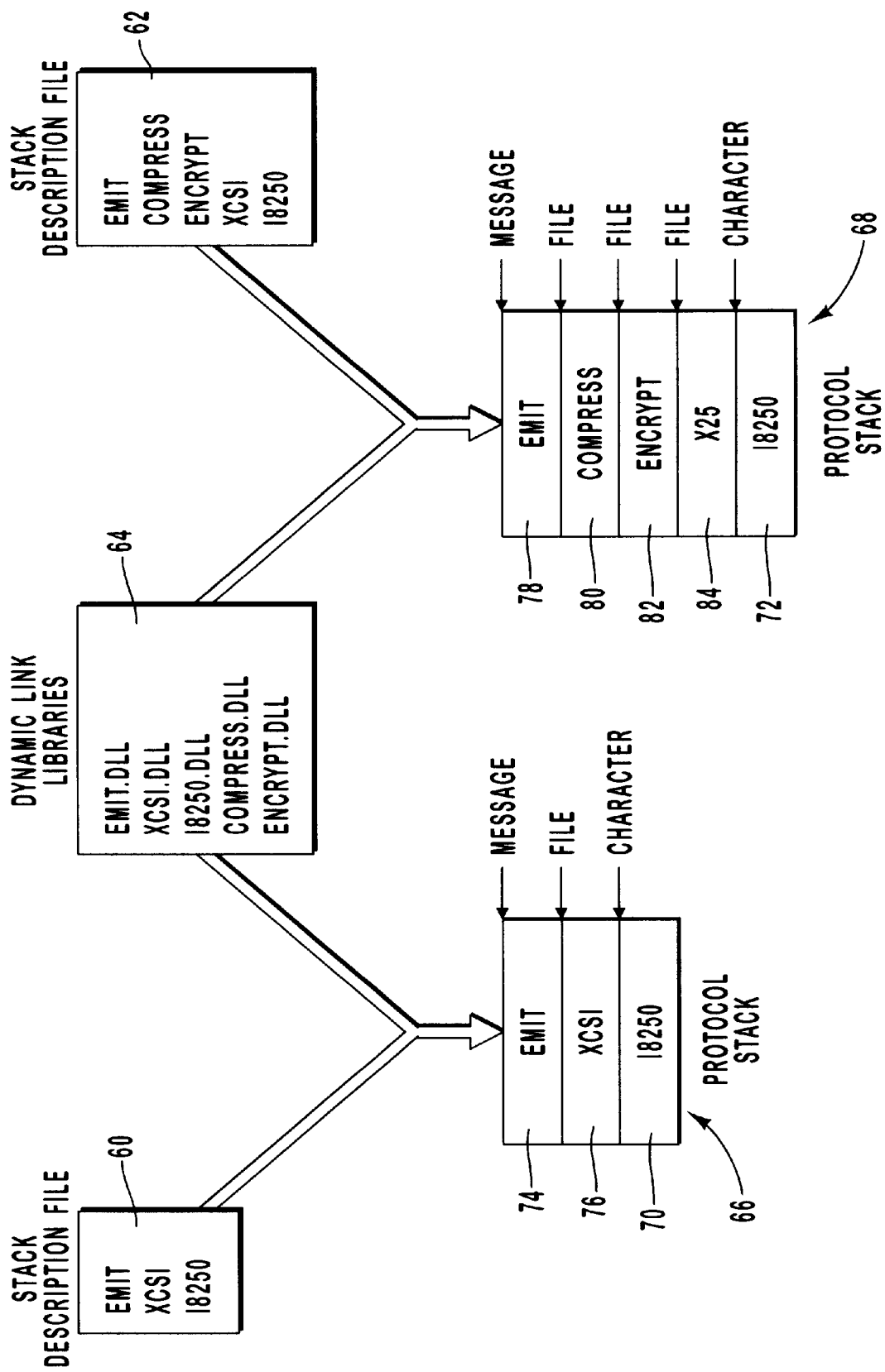
FIG. 2 is a block diagram of the relationship between the stack description files, dynamic link libraries and protocol stacks in accordance with the present invention.

With reference to FIG. 2, the relationships between stack description files 60 and 62, a dynamic link library 64 and protocol stacks 66 and 68, which might be established during execution of a communication program, are illustrated. In an actual system, such as computer 10 in FIG. 1, only one stack description file, one dynamic link library and one protocol stack would be found. The multiple stack descriptions and protocols stacks are for illustration only. Basically, the stack description files are made up of the names of the protocol layer objects and the order in which they should appear in the protocol stacks. Preferably, the files also include an initialization parameter for each layer. The protocol stacks can be created as long as the dynamic link library (DLL) that is associated with each particular layer is available. For example, if the DLL for the I8250 protocol layer objects 70 and 72 were missing from the DLL file, neither protocol stack 66 or 68 could be created.

This correspondence between the DLL file and the stack description files illustrates how simple it is to modify a protocol stack. For example, if it was desired to add compression to protocol stack 66, the only change that would have to be made is to add a reference to Compress in the stack description file 60 between the Emit and the XCSI references. When the protocol stack was next built, a Compress layer would appear in the protocol stack between the Emit protocol layer object 74 and the XCSI protocol layer object 76. The creation of the protocol stacks is described in greater detail below with reference to FIG. 5.

A dynamic class is defined within a dynamic link library for each protocol layer that will be used in a protocol stack. One requirement of the dynamic class is that it support a common interface, referred to in this example as the ProtocolInterface interface. In one actual embodiment, these interlayer interfaces or protocols that are defined are message, file and character. Thus, a protocol layer object must interact with other protocol layer objects via one of these types of protocols. For example, with reference to protocol stack 68, the information received by the EMIT protocol layer object 78 (from the communication program, not shown) is formatted in a message protocol. At the EMIT protocol layer object, the information is output in accordance with a file protocol which is necessary for the Compress and Encrypt protocol layer objects 80 and 82, respectively. When the file is processed by an X25 protocol layer object 84, it will produce a character based output from the protocol stack conforming to the X25 protocol standard. By matching these protocol interfaces between protocol layer object pairs, proper stacking takes place.

With reference to protocol stack 68, it is clear that the Compress protocol layer object 80 could be repositioned below the Encrypt protocol layer object 82 since both receive and output information according to a file protocol. As a further example, a system could easily be modified from an XCSI to an X25 system since both protocol layer objects (i.e., XCSI protocol layer object 76 and X25 protocol layer object 84) receive information per a file protocol and output per a character protocol.

Figure 3:
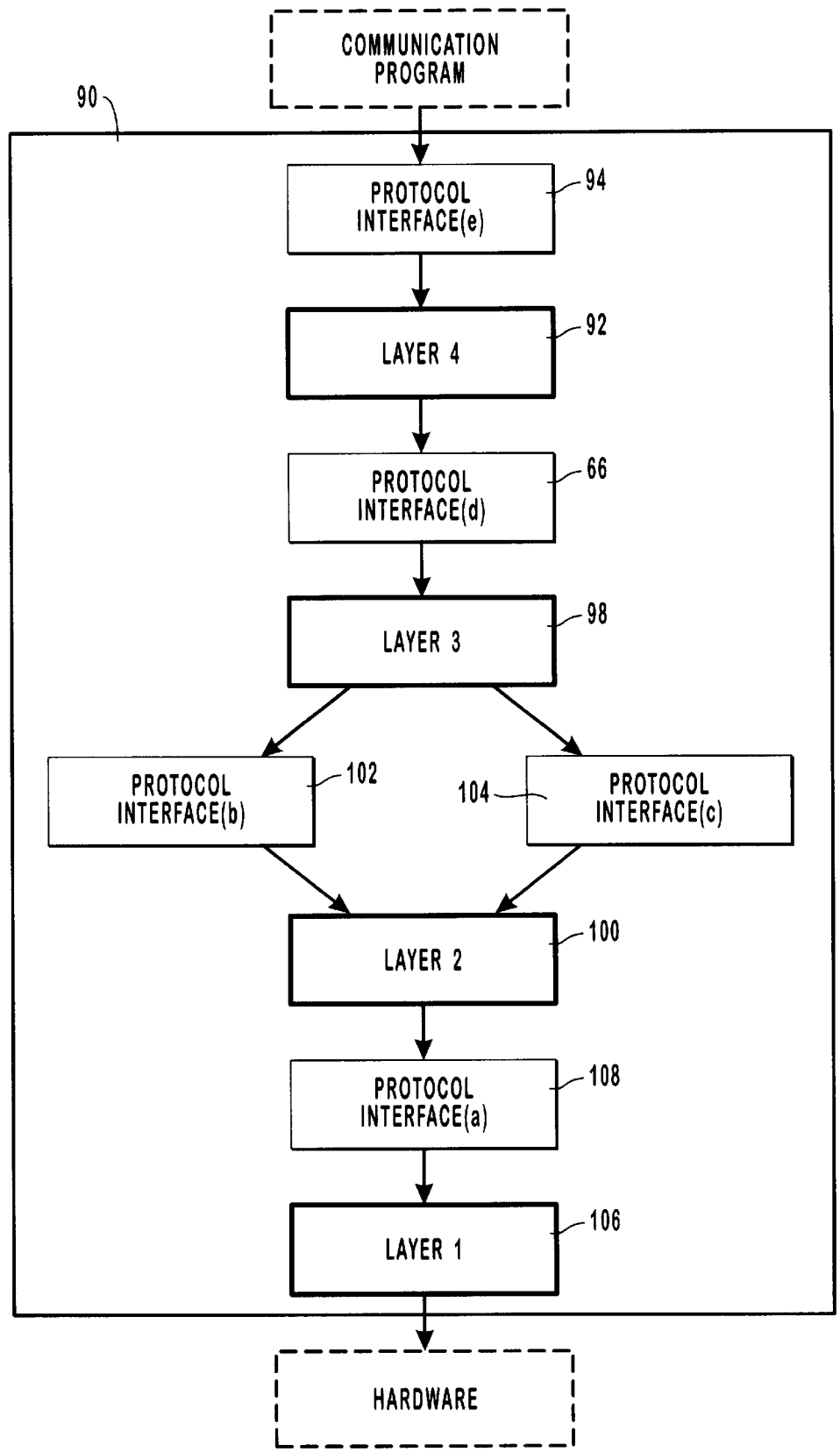
FIG. 3 is a detailed diagram of the inter-layer relationships within a protocol stack in accordance with the present invention.

As suggested, a protocol stack can be made up of any number of layers. However, each layer is connected to other layers in a consistent fashion. With reference to FIG. 3 a protocol stack 90 is made up of a series of protocol layer objects that communicate through protocol interfaces. Each protocol layer object is an implementation of a particular class of protocol object. Whatever the specific class of object a layer might be, it must support a predefined interface in order to be connectable in the protocol stack. In the present example, the predefined interface is referred to as the ProtocolInterface. This interface provides the methods for connecting the protocol layer objects to one another; in essence, the ProtocolInterface is used to plug protocol layer objects together to form a protocol stack.

In the illustrated protocol stack, Layer4 92 is the highest protocol layer object. In order to access the protocol stack and use its services, a communication program will access ProtocolInterface 94 which is exposed by Layer4. In turn, Layer4 uses ProtocolInterface 96 to access the services of Layer3 98. Layer3 accesses Layer2 100 via ProtocolInterface 102. Layer2 actually exposes multiple ProtocolInterfaces 102 and 104. ProtocolInterface 104 could be used by a different protocol layer object to connect to Layer2. Although multiple ProtocolInterfaces can be implemented, it is more common (and adequate) that only one such interface would be implemented for the present invention. Layer2 connects Layer1 106 via ProtocolInterface 108. Layer1 directly connects to the hardware.

In a preferred embodiment, as illustrated with protocol stacks 66, 68 and 90, the protocol layer objects are ordered relative to the level of abstraction away from the hardware represented by the protocol layer object's function. Thus, with reference to protocol stack 68, Layer4 of protocol stack 90 would correspond to the Emit protocol layer object 78 and Layer1 would correspond to the I8250 protocol layer object 72. This ordering corresponds to traditional program layering wherein the higher level layers are more universal, e.g., might represent a "standard" programming interface that can be called by a number of other programs, while the lower layers are more hardware dependent.

Protocol stacks 66 and 68 illustrate actual stacks that might be created by the present invention. The architecture that defines the protocol layer objects and how they are utilized is described next.

In one actual implementation of the present invention, the protocol class definitions are defined in accordance with the Object Linking and Embedding (OLE) architecture which is provided by Microsoft Corporation. The OLE object model is an object oriented programming model that encompasses dynamically created objects. A number of components are defined by OLE, each of which can be considered a basic building block in creating other object oriented systems. By adhering to the OLE architecture, one implementation of the present invention might include an object model that can be implemented by applications that wish to communicate with other OLE enabled entities.

As in the object oriented programming examples described in the Background of this document, in the OLE architecture objects provide services through interfaces. An object may provide one or more interfaces. According to the OLE architecture, each dynamic object has at least one interface that is accessible external to the object; the present invention defines an IProtocolLayer interface to serve this function. The IProtocolLayer is a primary interface that is used for binding initializing, and providing the basic operations needed to deal with the object.

The OLE architecture also includes a mechanism that is used to define and locate the IProtocolLayer interface. In the OLE architecture, QueryInterface is the method used for performing interface negotiation and for providing interface pointers of the correct type. QueryInterface is defined in an interface called IUnknown. At a minimum, an object that permits negotiation will support IUnknown. This is done by defining the OLE interfaces to include IUnknown. A client program, given a pointer to an OLE interface, can call QueryInterface on it. The caller passes in the identifier of the desired interface and receives a pointer that is either null— signifying that the interface is not supported—or not-null, in which case it is the correct interface pointer to use. Thus, the OLE architecture describes a minimum interface and the basic process for identifying that interface. By defining classes according to the OLE architecture, one can carry out the present invention in an object environment.

Figure 4:
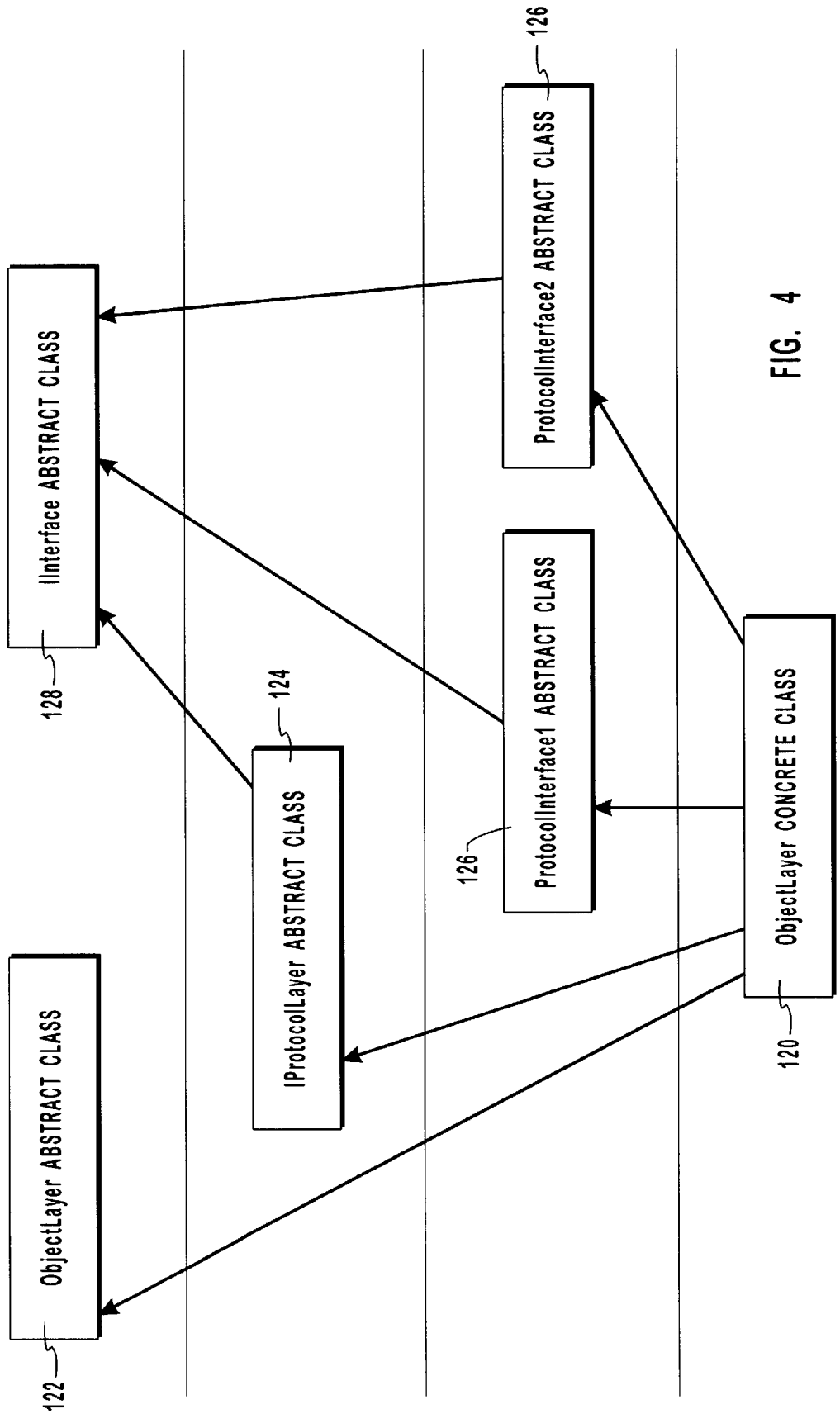
FIG. 4 is a diagram of the class definition for a protocol layer object in accordance with the present invention.

With reference to FIG. 4, the relationship between class definitions that might be implemented by the present invention are shown. The dynamic ObjectLayer class 120 is a concrete class that is used as a protocol layer object class. The creator of the protocol object definitions will create an ObjectLayer-type definition. The ObjectLayer class must derive from the DObject abstract class 122 (in order to conform to the dynamic binding model of OLE), IProtocolLayer abstract class 124 and an abstract class(es) that includes the ProtocolInterface(1 and 2) class 126 that the layer will expose. The IProtocolLayer and ProtocolInterface (s) classes derive from the IInterface abstract class 128. In this fashion, the bases classes DObject and IInterface are defined by the present invention.

Based on the relationships shown, the ObjectLayer class inherits all interfaces, e.g., DObject, ProtocolInterface1 and ProtocolInterface2. A dynamic object will be implemented by the ObjectLayer class and will appear to be a DObject. The only way to see the object, e.g., to access its methods, is through ProtocolInterface1 or ProtocolInterface2. For the present invention, these protocol interfaces might be defined as message, file or character. By defining a set of protocol interfaces, the acceptable connections between protocol layers is established.

Further, the appearance of the IProtocolLayer class ensures that when the protocol layer is created as an object, its "type" can be checked by looking for this interface. If the interface is supported, the system knows that the object is meant to be a protocol layer; if the interface is not supported, there may be an error, e.g., the particular object is not actually a protocol layer and was created erroneously.

Using this model, a programmer can create protocol classes for layers such as Compress, Encrypt, X25, etc. The classes are maintained as dynamic link libraries.

When building a protocol stack, each layer is represented by an instance of a class that defines the layer. The protocol stack is built at run time, based on a stack description in the stack description file. A host program such as the communication program includes a stack builder. When the communication program is executed by the central processor, it in turn executes the stack builder. The stack builder reads one layer description at a time from the stack description file. As each layer is read, the stack builder creates an object for the layer, ensures that is the proper type of object for the protocol stack, and attempts to connect the protocol layer object with the last protocol layer object that was established. In this manner, the stack is built one protocol layer object at a time, either from the bottom up or from the top down. If any creation or connection step fails, then the entire stack building process fails. By simply modifying the stack description file, by adding or deleting layer descriptions, and modifying the dynamic link library if necessary, the resultant protocol stack can be changed by re-executing the stack builder.

For purposes of the present invention, the Bind and QueryProtocol (e.g., the QueryInterface defined by OLE)

methods are the functions used to create the protocol stacks. The Bind method creates instances of dynamic classes. In the present case, the Bind operation creates instances of classes which represent protocol layer objects. The function takes an identification of an object and an identification of an interface of that object and returns an interface pointer which can be used to invoke the methods in that interface on that object. Once there is a pointer to a dynamic object, you must connect to an interface in order to use that object. In order to find specific interfaces in a dynamic class object, the QueryProtocol method is invoked on a dynamic class to get specific instances of its interfaces, particularly IProtocolLayer and the ProtocolInterfaces in the present case. In the dynamic class, an interface is a pointer to a pure virtual class. The program that is using the dynamic class can invoke all the (virtual) methods of the class.

Figure 5:
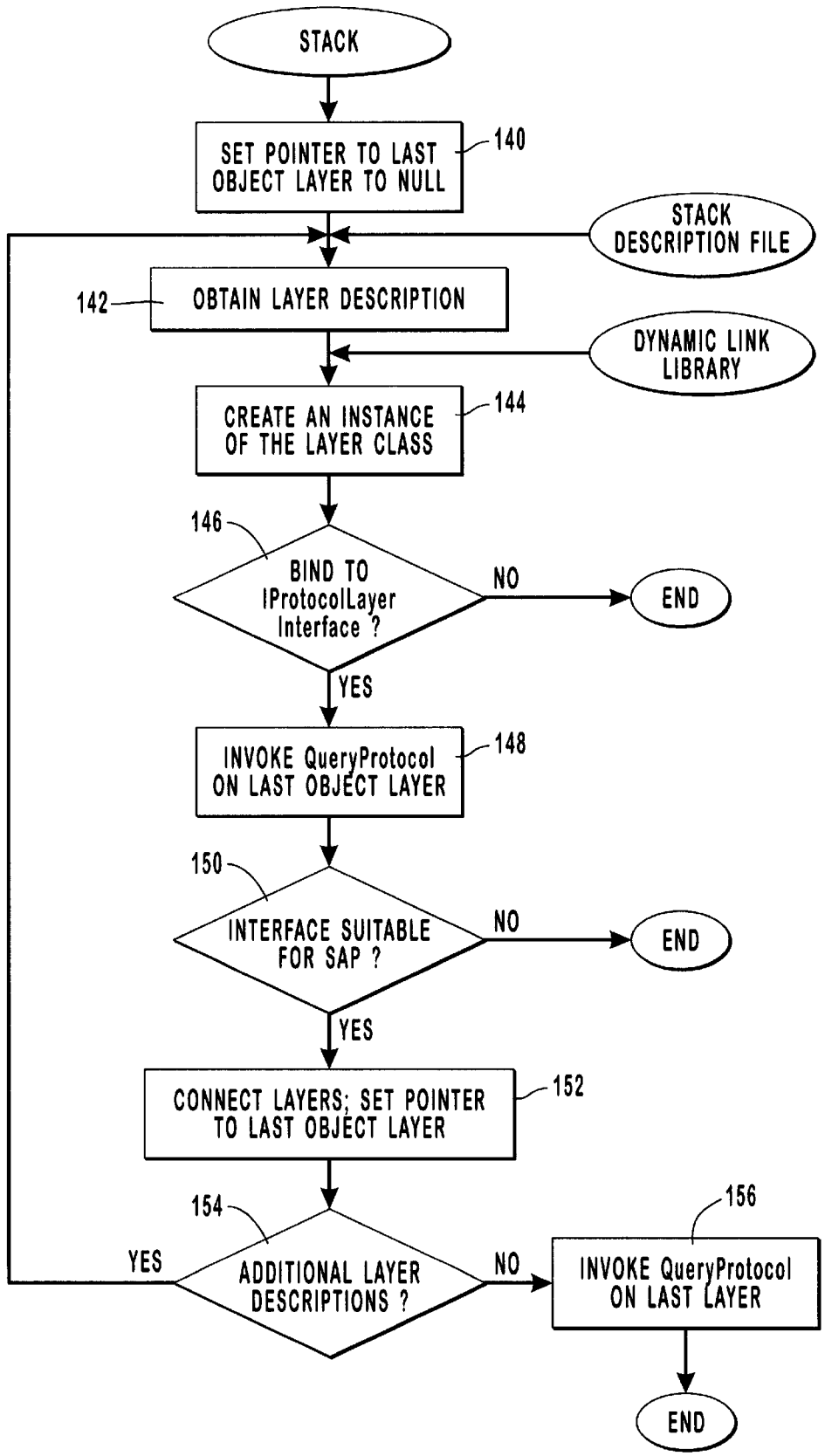
FIG. 5 is a flow diagram of a method for building a layered protocol stack in accordance with the present invention.

With reference to FIG. 5, at block 140 the stack builder process begins by initializing a layer pointer to the most recently created layer; at the beginning of the process, the layer pointer is assigned a null value. At block 142, a first layer description is retrieved from the stack description file. In one actual embodiment, the layers are listed, and thus read, from the bottom to the top of the stack description file. Preferably, and logically, the protocol layers are ordered relative to the level of abstraction away from the hardware represented by the layer's function. Although it is a straightforward process to create the protocol layers in a order according to the order in the stack description file, other methods might be used to determine the order in which the layer descriptions from the stack description file should be processed.

The stack builder uses the Bind operation to create an instance of the class which represents the layer at block 144. This operation is done using the layer description name, which is preferably the name of a corresponding dynamic object class in the dynamic link library. If a layer is to be used more than once in the same protocol stack, the layer will appear multiple times in the stack description file and an instance will be created for each use. For example, a testing layer may be inserted between multiple layers of a stack to monitor the activity at the ProtocolInterfaces.

At block 146, the stack builder then attempts to bind to the IProtocolLayer interface of the new object. This simply ensures that the IProtocolLayer is defined for the new object. If this bind fails, the new object does not satisfy the requirements of the protocol stack objects and the stack building process fails. Assuming the bind was successful, the stack builder then invokes QueryProtocol at block 148. This is an attempt to connect the new object to the last established protocol layer object in the stack. QueryProtocol is invoked with the layer pointer. The method queries the protocol layer object pointed to by the layer pointer for the ProtocolInterface that the new object needs. For example, if the new object is a Compress object, it needs a file ProtocolInterface below it since that is the form of information it outputs. QueryProtocol will identify all exposed ProtocolInterfaces. If the last created protocol layer object does not support the interface need by the new object, then, again, stack building fails at block 150. This ensures the correct behavior because only compatible layers are connected. This also allows new layer-to-layer interfaces to be defined in the future that will not impact other layers or the user of the protocol stack.

If the QueryProtocol method is successful, then at block 152 the connection is completed with the Bind method. At that time, the layer pointer is updated to point to the most recently established protocol layer object. At block 154, the process then checks whether there are additional layer definitions in the stack definition file. If there is still another layer to add, the process returns to block 142 and attempts to add the layer identified by the next layer definition.

If there are no more layers, at block 156, the last established protocol layer object is queried for the top-level interface. QueryProtocol is invoked to ensure that this protocol layer object supports the interface needed by the communication program, e.g., the message interface. If the interface is found, it is used by the communication program to enter the protocol stack through the top protocol layer object's interface. The communication program does not access any other layer.

Once the protocol stack is created, it is called through its top protocol layer object and processes data that is then passed to another communication program. Each time the communication program is executed the protocol stack will be built in accordance with the stack definition file. As long as the protocol requirements of the communication program do not change or fail, there is no reason to modify the protocol stack. However, it will be desirable to modify the protocol stack, for example, if the communication program is updated to include more or changed features or if the versions of the systems that are being connected have changed and have new or updated features. As noted above, the modification of the protocol stack is as easy as: updating the stack description file, defining or ensuring the availability of a corresponding DLL, and re-executing the stack builder.

Figure 6:
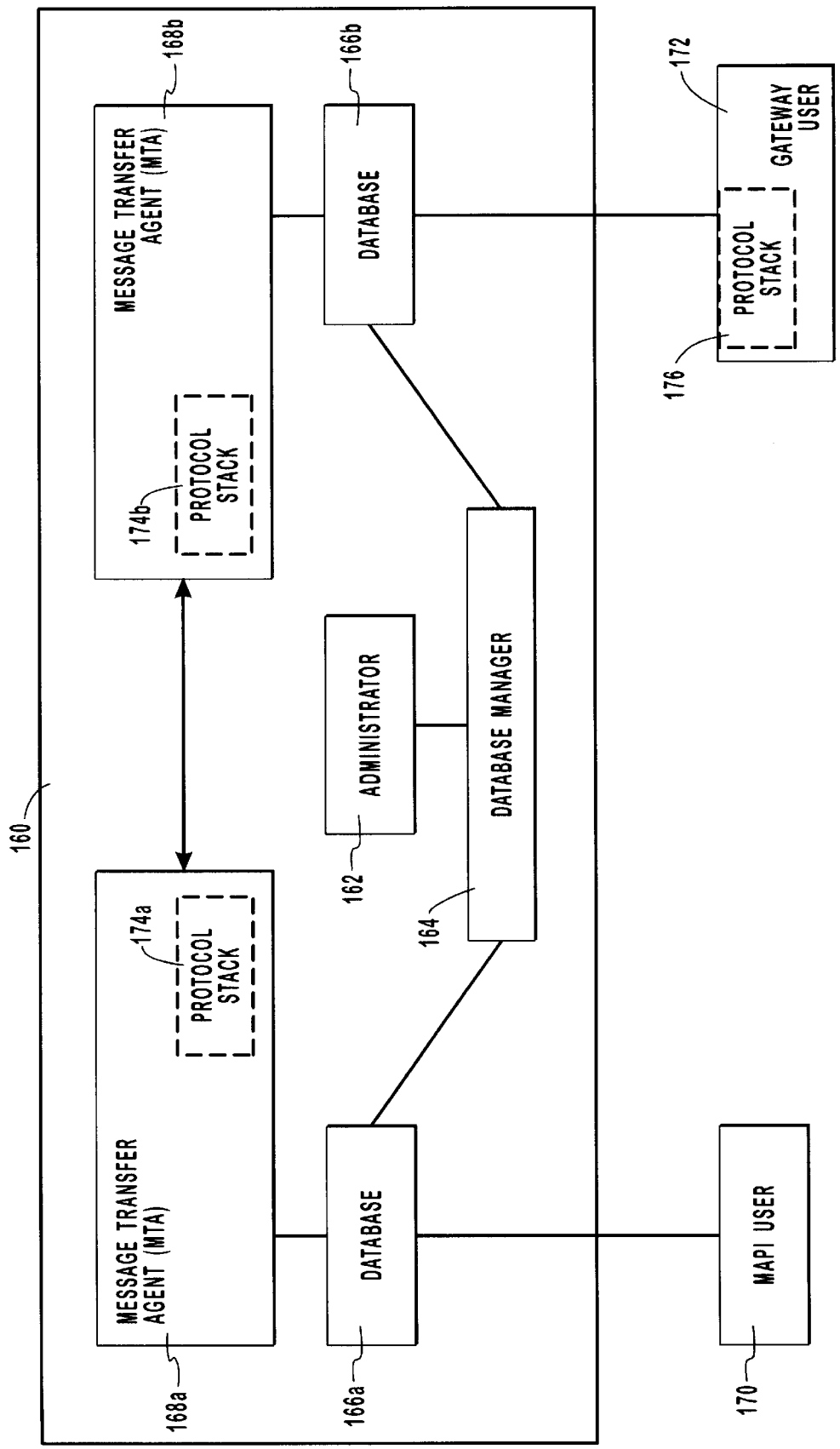
FIG. 6 is a block diagram of an electronic mail system in which the present invention can be incorporated.

As noted above, the present invention can be integrated into a communications system to allow for dynamic modification to all or part of the system. For additional understanding of the potential uses of the present invention, an electronic mail system is illustrated in FIG. 6. The electronic mail system 160, which is a shared file system, includes an administrator 162, a database manager 164, a set of databases 166(a) and (b), and a pair of message transfer agents (MTAS) 168(a) and (b). In the illustrated system, the database information includes user messages along with user directory information and routing information. The electronic mail system 160 may actually be a server computer that is dedicated to the electronic mail process.

The electronic mail system will service multiple users (or clients) such as user computer 170. The user might be a person using the mail system or might be an automated process, such as a program that regularly reports information such as stock prices. The user-to-database connection (client-server) might be governed by a known interface such as the Messaging Application Programming Interface (MAPI) utilized in the Microsoft Mail System.

The electronic mail system may also be connected to other systems, e.g., a commercial news service, via a gateway 172. A gateway is much like an MTA, although it is likely to also perform some type of format conversion function in order to match the formats of the two connected systems.

By definition, in a shared file system the messages reside in the databases and are not transferred out to the user's computer en mass. Thus, for the system capacity to increase, the number of databases must also increase to handle all user messages. The MTAs handle the transfer of messages between the databases within the electronic mail system. The protocol aspects of the communication are governed by protocol stacks 174(a) and (b) and 176. The relationship of an MTA or gateway to a protocol stack is identical to the relationship between a communication program and protocol stack described above. Thus, each MTA and the gateway include their own stack builder and stack description file, and access to a dynamic link library (not shown). When the MTA and gateway are executed, they build their respective protocol stacks as described above.

It is clear from the examples given that the present invention can be used to create, modify and extend protocol capabilities in a communication program. The present invention also provides a basis for increased product stability, ease of product maintenance, reuse of layers, and testability. Entirely new protocols, such as LU 6.2 can be added, or functionality such as encryption or compression can be added. A base set of layers can be developed and shipped as an entity, while other functionality can be added at a later convenient time.

While preferred embodiments of the invention have been illustrated and described, it will be appreciated that various changes can be made therein without departing from the spirit and scope of the invention. For example, the present invention can be used for more generalized functional stacks. Using the concepts described above, a functional description file can be created, and the stack builder can be used to create a layered functional stack. Further, at initialization, a protocol layer may also pass a pointer to one of its own interfaces to the lower layer. In this manner, the lower layer will be allowed to make "up-calls."

I claim:

1. In a computer system having a communications program that receives or sends messages to a second communications program running on a second computer system through a multi-layer protocol stack where individual layers of the protocol stack together provide the protocol functions that enable communications between the communications programs, a method for constructing the protocol stack using a stack builder comprising the steps of:
   (a) providing a stack description file comprising a plurality of individual protocol layer descriptions, one for each protocol layer that is to be included in the protocol stack, so that the plurality of individual protocol layer descriptions together define which protocol layers will be included in the protocol stack when it is constructed;
   (b) reading a first protocol layer description from said stack description file;
   (c) establishing a first protocol layer, having a protocol layer interface, in the protocol stack that corresponds to said first protocol layer description read from said stack description file;
   (d) with the stack builder, for each remaining protocol layer description in said stack description file, performing at least the steps of:
       (i) reading another protocol layer description from said stack description file;
       (ii) establishing another protocol layer, having a protocol layer interface, in the protocol stack that corresponds to said another protocol layer description read from said stack description file; and
       (iii) connecting said another protocol layer to a previously established protocol layer using a protocol interface from said previously established protocol layer in order to form a plurality of interconnected protocol layers that together form the protocol stack; and
   (e) after all layers of the protocol stack have been established and interconnected, then providing an interface from one of said protocol layers to the communication program so that the communication program uses said interface to access the protocol functions provided by the protocol stack.

2. A method as claimed in claim 1 wherein the step of reading the stack description file includes reading said protocol layer descriptions in a predetermined order and wherein the interface provided to the communications program is the protocol interface of a top layer in the protocol stack.

3. A method as claimed in claim 1 wherein the step of establishing each protocol layer includes the steps of creating an instance of a class and creating a protocol layer object from said instance of a class, said protocol layer object representing said protocol layer, whereby said protocol layer objects are connected to form said protocol stack.

4. A method as claimed in claim 3 wherein said step of establishing a protocol layer further includes the step of determining whether said protocol layer object is the required type for said stack protocol, whereby said step of establishing a protocol layer fails if said protocol layer object is not said required type.

5. A method as claimed in claim 3 wherein said step of connecting said another protocol layer to said previously established protocol layer includes the step of determining whether said interface that will be used for said connection meets the requirements of said protocol layer to which it will be connected, whereby said step of connecting fails if said requirements are not met.

6. A method as claimed in claim 1 wherein said steps of reading, establishing, connecting and providing are carried out by a stack builder, and wherein said method includes the step of executing a communication program, which, in turn, executes said stack builder.

7. In a computer system having a communications program that receives or sends messages to a second communications program running on a second computer system through a multi-layer protocol stack where individual layers of the protocol stack together provide the protocol functions that enable communications between the communications programs, a method for constructing the protocol stack using a stack builder comprising the steps of:
   (a) creating a stack description file having a plurality of protocol layer descriptions, each describing a protocol layer that is to be included in the protocol stack, so that the plurality of protocol layer descriptions together define which protocol layers will be included in the protocol stack when it is constructed;
   (b) obtaining a first protocol layer description from said stack description file;
   (c) establishing a first protocol layer, having a protocol interface, in the protocol stack that corresponds to said first protocol layer description using the stack builder;
   (d) with the stack builder, for each remaining protocol layer description in said stack description file:
       (i) obtaining said protocol layer description from said stack description file;
       (ii) establishing a current protocol layer, having a protocol interface, that corresponds to said protocol layer description read from said stack description file; and
       (iii) connecting said current protocol layer to a previously established protocol layer using a protocol interface from said previously established protocol layer in order to form a plurality of interconnected protocol layers that together form the protocol stack; and
   (e) providing an interface from a protocol layer to the communication program so that the communication program uses said interface to access the protocol functions provided by the protocol stack.

8. A method as claimed in claim 7 wherein the step of reading the stack description file includes reading said protocol layer descriptions in a predetermined order and wherein the interface from a top protocol layer is provided to the communications program.

9. A method as claimed in claim 7, further including the step of modifying the stack description file prior to carrying out the other steps so that said resulting protocol stack is modified.

10. A method as claimed in claim 7 wherein the step of establishing each protocol layer includes the steps of creating an instance of a class and creating a protocol layer object from said instance of a class, said protocol layer object representing said protocol layer, whereby said protocol layer objects are connected to form said protocol stack.

11. In a computer system having a communications program that receives or sends messages to a second communications program running on a second computer system through a multi-layer protocol stack where individual layers of the protocol stack together provide the protocol functions that enable communications between the communications programs, a method for constructing the protocol stack using a stack builder comprising the steps performed under the control of the stack builder of:
   (a) providing a stack description file comprising a plurality of individual protocol layer descriptions, one for each protocol layer that is to be included in the protocol stack, so that the plurality of individual protocol layer descriptions together define which protocol layers will be included in the protocol stack when it is constructed;
   (b) reading a first protocol layer description from said stack description file;
   (c) creating a first protocol object, having a protocol interface, that corresponds to said first protocol layer description read from said stack description file;
   (d) for each remaining protocol layer description in said stack description file, performing at least the steps of:
      (i) reading another protocol layer description from said stack description file;
      (ii) creating another protocol object, having a protocol interface, that corresponds to said another protocol layer description; and
      (iii) connecting said another protocol object to a previously created protocol object using a protocol interface from one of said protocol objects in order to form a plurality of interconnected protocol objects that together form the protocol stack; and
   (e) providing an interface from a protocol object to the communication program so that the communication program uses said interface to access the protocol functions provided by the protocol stack.

12. A method as claimed in claim 11 wherein said step of creating a protocol object further includes the step of determining whether said protocol object is the required type for said stack protocol, whereby said step of establishing a protocol object fails if said protocol object is not said required type.

13. A method as claimed in claim 11 wherein said step of connecting said another protocol object to said previously established protocol object includes the step of determining whether said interface to be used for said connection meets the requirements of said protocol object to which it will be connected, whereby said step of connecting fails if said requirements are not met.

14. A method for building a functional stack for use by a host program that includes a stack builder for building a stack of functional layers, the method including the steps performed by the stack builder of
   (a) reading a first functional layer description from a functional description file, said functional description file including a set of functional layer descriptions, one for each layer that is to be included in the functional stack, so that the set of functional layer descriptions together define which functional layers will be included in the functional stack when it is constructed;
   (b) establishing an initial functional layer that corresponds to said first functional layer description, said initial functional layer having a functional interface;
   (c) for each remaining functional layer description in said functional description file:
      (i) reading said functional layer description from said functional description file;
      (ii) establishing a current functional layer corresponding to said functional layer description, said functional layer having an interface; and
      (iii) connecting said current functional layer to a previously established functional layer using an interface from one of said functional layers, such that said connected functional layers make up a functional stack; and
   (d) providing an interface from a functional layer to the host program, whereby the host program uses said interface to invoke the processes of said functional stack.

15. A method as claimed in claim 14 wherein said functional description file is modified prior to carrying out the steps of the method in order to modify the functional stack.

16. A protocol stack building system for creating a protocol stack implementing a communications protocol, said protocol stack having a plurality if individual layers that together provide protocol functions that make up the communications protocol and that can be accessed by a communication program to communicate to a second communication program using the protocol implemented by the protocol stack, the protocol stack building system being implemented in a computer system having a memory component and a processor, the protocol stack building system including:
   (a) a stack description file stored in memory, the stack description file including a plurality of protocol layer descriptions, each defining a protocol layer that is to be included in the protocol stack, so that the plurality of protocol layer descriptions together define which protocol layers will be included in the protocol stack when it is created;
   (b) a stack builder in the communication program that is executed by the processor in order to create the protocol stack defined in said stack description file, said stack builder including means for:
      (i) accessing a first protocol layer description stored in said stack description file;
      (ii) establishing a first protocol layer, having a protocol interface, in the protocol stack that corresponds to said first protocol layer description from the stack description file; and
      (iii) for each remaining protocol layer description in said stack description file:
         (1) accessing another protocol layer description stored in said stack description file;

(2) establishing another protocol layer, having a protocol interface, in the protocol stack that corresponds to said another protocol layer description from the stack description file; and (3) connecting the another protocol layer to a previously established protocol layer using a protocol interface from said previously established protocol layer in order to form a plurality of interconnected protocol layers that together form the protocol stack that can be accessed by the communication program using an interface of one of said protocol layers.

17. A protocol stack building system as claimed in claim 16, further including a set of dynamic link libraries, each library corresponding to a protocol layer description, and wherein said steps of establishing protocol layers create an instance of a class and an object from said instance for each protocol layer, whereby said objects are connected to form said protocol stack.

18. In a computer system having a communications program that receives or sends messages to a second communications program running on a second computer system through a multi-layer protocol stack where individual layers of the protocol stack together provide the protocol functions that enable communications between the communications programs, a computer-readable storage medium holding instructions for directing the computer system to perform a method for constructing the protocol stack using a stack builder, said method including the steps performed under the control of the stack builder of:

(a) reading a first protocol layer description from a stack description file, said stack description file including a plurality of protocol layer descriptions, one for each protocol layer that is to be included in the protocol stack, so that the plurality of protocol layer descriptions together define which protocol layers will be included in the protocol stack when it is constructed;

(b) establishing an initial protocol layer that corresponds to said first protocol layer description, said initial protocol layer having a protocol interface;

(c) for each remaining protocol layer description in said stack description file:

(i) reading said protocol layer description from said stack description file;

(ii) establishing a current protocol layer corresponding to said protocol layer description, said current protocol layer having an interface; and (iii) connecting said current protocol layer to a previously established protocol layer using an interface from said previously established protocol layer, thereby creating a protocol stack from said protocol layers; and (d) providing an interface from one of said protocol layers to the communication program so that the communication program uses said interface to access the protocol functions provided by the protocol stack.

19. The computer-readable storage medium of claim 18 wherein the instructions for performing the step of reading the stack description file read said protocol layer descriptions in a predetermined order and wherein the interface from a top protocol layer is provided to the communications program.

20. The computer-readable storage medium of claim 18 wherein the instructions for performing the step of establishing each protocol layer create an instance of a class and create a protocol layer object from said instance of a class, said protocol layer object representing said protocol layer, whereby said protocol layer objects are connected to form said protocol stack.

21. The computer-readable storage medium of claim 18 wherein the instructions for performing said step of connecting said current protocol layer to said previously established protocol layer determine whether said interface that will be used for said connection meets the requirements of said protocol layer to which it will be connected, whereby said step of connecting fails if said requirements are not met.

22. The computer-readable storage medium of claim 20 wherein the instructions for performing said step of establishing a protocol layer further determine whether said protocol layer object is the required type for said stack protocol, whereby said step of establishing a protocol layer fails if said protocol layer object is not said required type.

23. In a computer system having a communications program that receives or sends messages to a second communications program running on a second computer system through a multi-layer protocol stack where individual layers of the protocol stack together provide the protocol functions that enable communications between the communications programs, a computer-readable storage medium holding instructions for performing a method for constructing the protocol stack using a stack builder, the method including the steps performed under the control of the stack builder of:

(a) reading a first protocol layer description from a stack description file, said stack description file including a plurality of protocol layer descriptions, one for each protocol layer that is to be included in the protocol stack, so that the plurality of protocol layer descriptions together define which protocol layers will be included in the protocol stack when it is constructed;

(b) creating an initial protocol object, having a protocol interface, that corresponds to said first protocol layer description;

(c) creating a protocol stack by performing at least the following steps for each remaining protocol layer description in said stack description file:

(i) reading said protocol layer description from said stack description file;

(ii) creating a current protocol object, having a protocol interface, corresponding to said protocol layer description; and (iii) connecting said current protocol object to a previously established protocol object using an interface from one of said protocol objects; and (d) providing an interface from a protocol object to the communication program so that the communication program uses said interface to access the protocol functions provided by the protocol stack.

24. The computer-readable storage medium of claim 23 wherein the instructions for performing said step of establishing a protocol object determine whether said protocol object is the required type for said stack protocol, whereby said step of establishing a protocol object fails if said protocol object is not said required type.

25. The computer-readable storage medium of claim 23 wherein the instructions for performing said step of connecting said current protocol object to said previously established protocol object determine whether said interface to be used for said connection meets the requirements of said protocol object to which it will be connected, whereby said step of connecting fails if said requirements are not met.

* * * * *

UNITED STATES PATENT AND TRADEMARK OFFICE
CERTIFICATE OF CORRECTION

PATENT NO. : 5,903,754
DATED : May 11, 1999
INVENTOR(S) : Malcom E. Pearson

It is certified that error appears in the above-identified patent and that said Letters Patent is hereby corrected as shown below:

Col. 2, ln. 60: after "or more" change "method" to --methods--

Col. 3, ln. 5: after "();" and before "};" insert a line break

Col. 3, ln. 51: after "number of" change "program" to --programs--

Col. 9, ln. 59: after "binding" and before "initializing" insert --,--

Col. 10, ln. 22: before "classes" move "(s)" up to previous line

Col. 11, ln 27: after "layers in" change "a" to --an--

Signed and Sealed this

Tenth Day of October, 2000

Attest:

Attesting Officer

Q. TODD DICKINSON

Director of Patents and Trademarks